United States Patent [19] [11] Patent Number: 6,071,488
Minet [45] Date of Patent: Jun. 6, 2000

[54] USE OF METAL OXYCHLORIDES FOR REMOVAL OF HYDROGEN CHLORIDE FROM MIXED GASES

[75] Inventor: Ronald G. Minet, Pasadena, Calif.

[73] Assignee: Medalert, Inc., Pasadena, Calif.

[21] Appl. No.: 09/143,603

[22] Filed: Aug. 31, 1998

[51] Int. Cl.[7] .................................................. C01B 7/04
[52] U.S. Cl. ...................... 423/502; 423/507; 423/240 S
[58] Field of Search .................................... 423/502, 507, 423/240 S

[56] References Cited

U.S. PATENT DOCUMENTS

| | | | |
|---|---|---|---|
| 2,333,845 | 11/1943 | Danforth | 423/507 |
| 2,436,870 | 3/1948 | Murphree | 423/507 |
| 2,448,255 | 8/1948 | De Benedictis et al. | 423/502 |
| 2,542,961 | 2/1951 | Johnson et al. | 423/502 |
| 2,577,808 | 12/1951 | Pye et al. | 423/502 |
| 2,602,021 | 7/1952 | Belchetz | 423/502 |
| 2,987,378 | 6/1961 | Thoma | 423/507 |
| 3,332,742 | 7/1967 | Metaizeau | 423/507 |
| 3,383,177 | 5/1968 | Metaizeau | 423/502 |
| 4,119,705 | 10/1978 | Riegel et al. | 423/507 |
| 4,774,070 | 9/1988 | Itoh et al. | 423/502 |
| 4,822,589 | 4/1989 | Kiyoura et al. | 423/502 |
| 4,959,202 | 9/1990 | Minet et al. | 423/502 |
| 4,994,256 | 2/1991 | Minet et al. | 423/502 |
| 5,154,911 | 10/1992 | Benson et al. | 423/502 |
| 5,639,436 | 6/1997 | Benson et al. | 423/502 |

FOREIGN PATENT DOCUMENTS

| | | |
|---|---|---|
| 1068676 | 10/1957 | Germany . |
| 49-33751 | 9/1974 | Japan .................................. 423/502 |
| 1257102 | 10/1987 | Japan . |

OTHER PUBLICATIONS

"Oxychlorination Catalysts", Allen, J. A. and Clark, A. J., (Dept. of Chemistry, University of Newcastle, N.S.W. 2308) Reviews of Pure and Applied Chemistry vol. 21, 1971, pp. 145–166 (no month).

*Primary Examiner*—Ngoc-Yen Nguyen
*Attorney, Agent, or Firm*—William W. Haefliger

[57] ABSTRACT

A process for producing chlorine comprises the steps of oxidizing hydrogen chloride in the presence of a catalyst in an oxidation reactor, passing the product gas together with the catalyst removed from the oxidation reactor to a high velocity transporter at a temperature between 150–250° C. to remove the residual HCl from the product gas, removing the catalyst from the product and recycling the removed catalyst back to the oxidation reactor.

12 Claims, 2 Drawing Sheets

|  | A<br>FEED INLET | B<br>REACTOR<br>GAS OUTLET | C<br>CATALYST<br>OUTLET | D<br>CATALYST<br>RECYCLE | E<br>GAS<br>PRODUCT |
|---|---|---|---|---|---|
| COMPONENT Lbs/hr |  |  |  |  |  |
| HCl | 104 | 22 | — |  | — |
| O2 | 66 | 33 |  |  | 33 |
| N2 | 264 | 264 |  |  | 264 |
| Cl2 | — | 100 |  |  | 100 |
| H2O | — | 25 |  |  | 25 |
| CATALYST | — | — | 15000 | 15022 | — |

6,071,488

USE OF METAL OXYCHLORIDES FOR REMOVAL OF HYDROGEN CHLORIDE FROM MIXED GASES

BACKGROUND OF THE INVENTION

This invention relates generally to an improved process and apparatus for removal of hydrogen chloride from mixed gases; and specifically allows for the conversion of hydrogen chloride in the feed stream to chlorine in a product stream with the resulting product gas containing at least 95% of the entering chlorine in the hydrogen chloride component to chlorine. In the course of the process metallic oxychlorides and metallic chlorides are formed and used combined with porous carriers in the improved simplified process.

There is a need for simple economic processes to convert hydrogen chloride usually a by-product or a potential waste product, to permit the recovery of chlorine for recycle and chemical use by means of a catalytic carrier system. There is also need for such processes to simplify removal of hydrogen chloride from a feed stream of mixed gases by formation of metallic hydroxychloride and metallic chlorides on porous catalytic carrier consisting of fluidized particulate materials such as zeolites, alumina, silica and other adsorbents.

SUMMARY OF THE INVENTION

It is a major object of the invention to provide a simplified, economic process meeting the above needs. Basically, the process for recovering chlorine from a feed stream of gas containing hydrogen chloride comprises steps that include:

a) providing an oxidation reactor;

b) providing and passing carrier catalyst which contains metallic chlorides, metallic hydroxy chloride, and metallic oxide to said oxidation reactor to form a bed which is operated at temperatures between about 300 and 420; said metallics being impregnated in particulate; fluidizable solid which is porous and can adsorb and desorb hydrogen chloride, and which are selected from the group that includes zeolite, alumina, silica, carbon or mixtures thereof, c) supplying said feed stream containing hydrogen chloride and oxygen bearing gas to fluidize said oxidizer reactor bed, and for exothermic reaction with the metallic chlorides, metallic oxides and the metallic hydroxy chloride in the carrier catalyst to produce an overhead gas stream of chlorine, unreacted hydrogen chloride, inerts, water and residual oxygen, d) removing catalytic carrier catalyst containing metallic oxides from the bed for commingling with the oxidizer reactor overhead gas stream at temperatures between 150 and 250° C., with the overhead gas product passing to a hydrogen chloride separation step with the metallic oxides on the catalytic carrier catalyst thereby substantially eliminating the hydrogen chloride in said overhead stream, and to produce a gaseous product stream including chlorine, oxygen, inerts and water vapor, e) and removing the catalytic carrier catalyst containing metallic chlorides along with metallic hydroxy chloride and residual metallic oxides to recycle said carrier catalyst to said oxidation reactor, f) and providing a riser high velocity transporter wherein said commingling takes place.

It is another object to provide a riser, high velocity mixer and separator and passing said exit overhead stream in which the catalytic carrier is entrained into a cyclone separator during a contact time of between 0.5 and 60 seconds for separation of solids and gas flow with the return of the solids to the oxidation reactor and the delivery of the gas as a chlorine rich product gas stream for further treatment.

In the process the rate of flow to the oxidation reactor of metallic oxide and metallic hydroxychloride bearing carrier catalyst separated from the gas flow is controlled to the oxidation reactor, and from the oxidation reactor is controlled to supply the requirements for fast mixing in the riser transporter.

These and other objects and advantages as well as details of an illustrative embodiment will be more fully understood from the following specification and drawings, in which:

DRAWING DESCRIPTION

FIG. 1 is a block flow diagram with associated statement of material balance quantities; and FIG. 2 is a process flow diagram.

DETAILED DESCRIPTION

Figure 1:
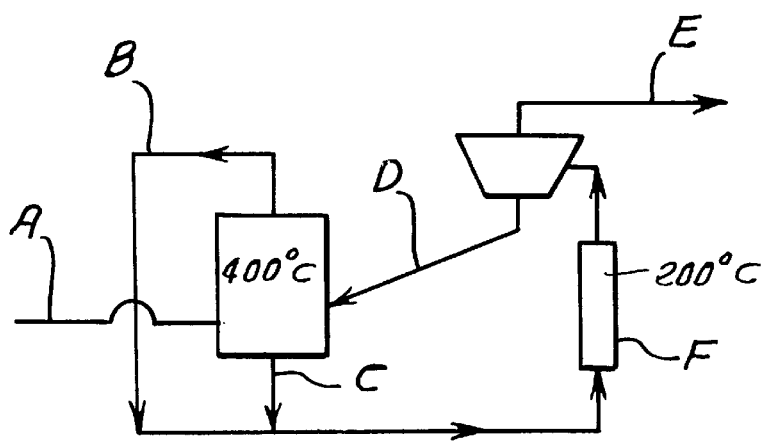

FIG. 1 is a block flow diagram with a material balance for the single stage reactor HCl oxidation process the feed gas (A) containing HCl, oxygen bearing gas, water, inerts and impurities enters the oxidation reactor for contact with the catalytic carrier at 300 to 420° C. wherein the HCl reacts with oxygen to approximately thermodynamic equilibrium giving 60 to 80% conversion of the HCl to $Cl_2$ and water in the presence of the catalytic carrier bearing metallic chlorides, hydroxy chlorides and metallic oxides.

The reactor overhead gas (B) is separated from the catalyst, cooled, compressed and combined with cooled catalytic carrier (C) via an eductor and carried into a high velocity transporter (F) where the unreacted HCl is removed to give on exit stream containing chlorine, oxygen, inerts, water, nitrogen and the carrier catalyst is removed in a cyclone type separator. The gas flows to other treatment systems for recovery of chlorine while the catalytic carrier is returned to the oxidation reactor.

Figure 2:
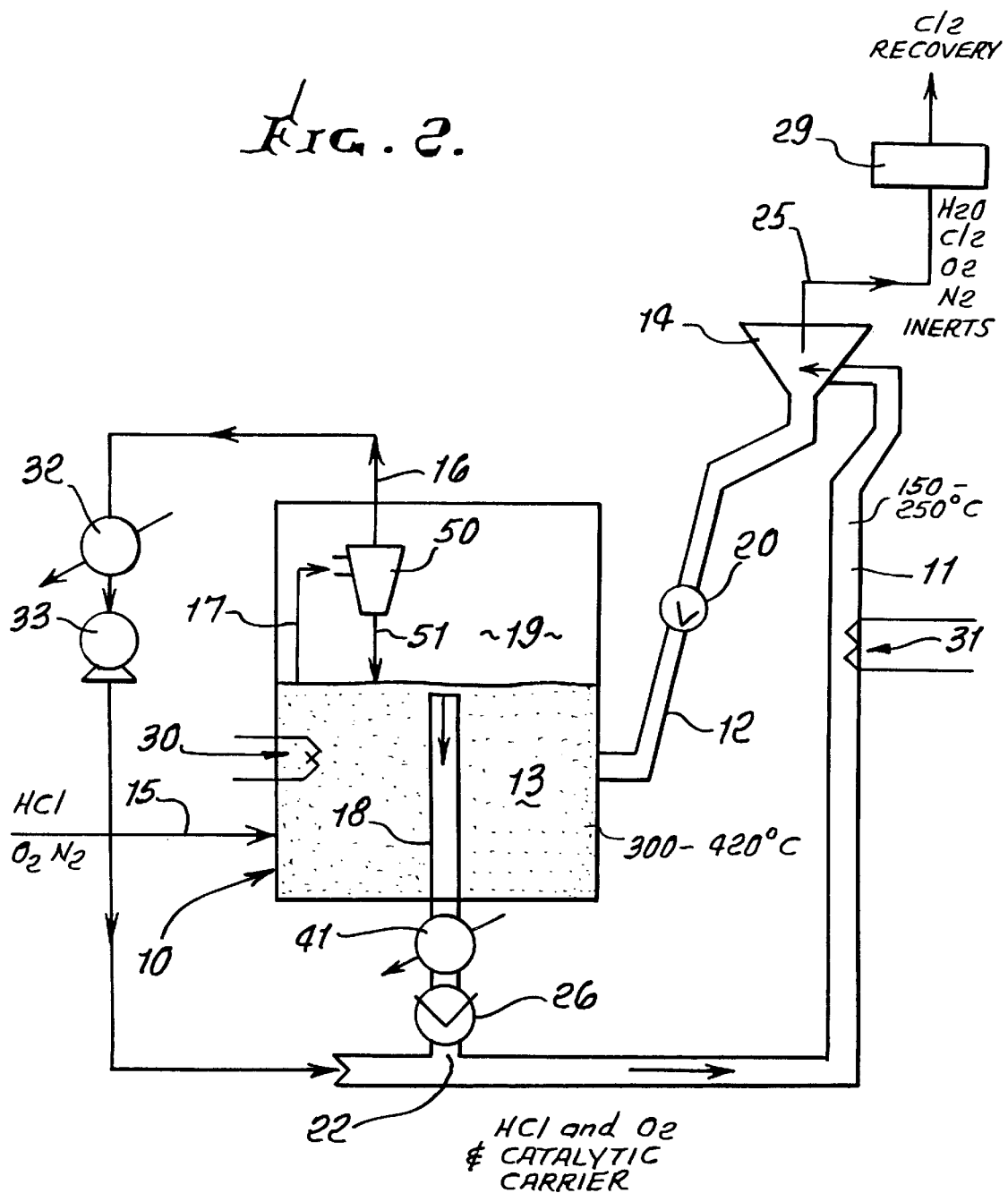

In FIG. 2 an oxidation reactor is provided at 10 and a riser type high velocity transporter at 11. Carrier catalyst containing metallic chlorides, hydroxychlorides and promotors (see claims) to control metallic volatilization is passed to the reactor at 12 to form a fluidized bed 13 operated at a temperature between 300 and 420° C., the catalyst delivered from separator 14 typically of cyclone type.

A feed stream containing hydrogen chloride and oxygen bearing gas is supplied at 15 to fluidize the bed 13 and for exothermic reaction with the hydrogen chloride to form chlorine and water in the presence of the metallic chlorides and oxychlorides in the carrier catalyst (in a version of a modified Deacon reactor) to produce an overhead stream 16 which is removed from the reactor 10 as flow 17 containing chlorine, unreacted oxygen, unreacted HCl, water and inerts. A cyclone separator may be employed at 50 to remove particulates from the overhead stream delivered at 17, and particulates are returned at 51 to the reactor bed.

Catalytic carrier is removed from bed 13 for flow in downcomer 18 that opens upwardly into the interior 19 of the reactor 10. The depth of the bed 13 may be controlled to facilitate such catalyst removal and a control such as valve 20 may be provided in the catalyst feed line 12 for this purpose. The catalyst tends to rise in the bed for gravity flow removal via the downcomer 18.

The removed catalyst is cooled at 41 to 150 to 250° C. by a heat exchanger to permit recovery of energy for use in other parts of the system. Cooled catalyst is passed through valve 26 to be entrained via eductor 22 by the pressurized overhead stream for the removal of hydrogen chloride in the riser transporter 11 during a residence time of 0.5 to 60 seconds which permits re-circulation of the catalytic carrier back to the oxidation reactor whereby hydrogen chloride is substantially removed from the gaseous overhead stream to produce a product stream at 25 which includes chlorine, water, inerts and unreacted oxygen but substantially no hydrogen chloride which is combined in the carrier catalyst. A chlorine recovery system is indicated at 29. The catalytic carrier with metallic chlorides, oxychlorides, hydroxychlorides and oxides is separated in separator 14 as described above for return and flows 12 to reactor 10. Fresh catalyst as required may be added at 12.

Heat exchangers are indicated at 30 and 31 in association with reactor 10 and transporter 11 to receive heat for transmission to energy recovery means such as waste heat boilers and to control temperatures in the catalytic carrier system. A cooler 32 and a compressor 33 are provided to facilitate the movement of the oxidation reactor overhead gas stream to the inlet of the transporter via eductor 22.

An equation representative of the reaction in reactor 10 where "M" represents metallic component is as follows:

$$M_xO_y + HCl \rightleftarrows M_xO_yHCl$$

$$M_xO_yHCl + O_2 \rightleftarrows M_xCl + H_2O + HCl + Cl_2$$

The removal step in the transporter 11 may be represented by:

$$M_xO_y + HCl \rightleftarrows M_xO_yHCl$$

It is useful to explain in more detail the function and operation of the high velocity transporter-riser system using the numbering system shown in FIG. 2. In the oxidizer reactor 10 the hydrogen chloride is reacted with oxygen at a necessarily high temperature in the range of 300 to 420° C. to produce an equilibrium gas containing chlorine and unconverted hydrogen chloride. For the successful economic operation of the process, it is necesseary to remove the hydrogen chloride from the equilibrium gas product. This separation is carried out by cooling the catalytic carrier in heat exchanger 41 and passing the fluidized catalytic carrier through the controller 26 and an eductor 22 to mix with circulated gas at 150 to 250° C. at the entrance to the high velocity transporter-riser.

The gas and catalytic carrier are transported vertically in the riser 11, with a contact time of 5 to 20 seconds passing through heat exchanger 31 and into a cyclone separator 14. Fluidized catalytic carrier thus separated passes through a control valve 20 and returns to the oxidizer reactor 10 to join the fluidized bed and react with the feed stream 15 of hydrogen chloride and oxygen bearing gas.

The separated gas from the cyclone 14 overhead flows at 25 to a downstream chlorine recovery system to separate water and inerts in standard equipment, to produce a product chlorine stream which will be free from hydrogen chloride, water and various inert gases to be used for chemical reaction of the chlorine as a gas or as a liquid. The recovery system will be a standard series of steps including wash with concentrated sulfuric acid, compression and possibly liquifaction of the chlorine by refrigerator.

The use of the preferred lift pipe riser high velocity transport system permits the recycle of the catalytic carrier at a circulating rate which is sufficient to transport the recovered and adsorbed hydrogen chloride back to the oxidation reactor for conversion to chlorine, and is an essential unique element in this process. The active metal on the catalyst, i.e. copper, and other metals circulated will be approximately 5 to 15 times the weight flow of the hydrogen chloride introduced into the oxidation reactor and the chlorine product recovered from the process.

Additional features include:
a) In the high velocity transporter, HCl is removed in a residence time of between 0.5 and 60 seconds;
b) Catalytic carrier catalyst entrained in the overhead stream riser at velocities between 20 and 80 feet per second;
c) Metallic oxides rise in the oxidizer reactor at rates between 0.5 and 5.0 feet per second;
d) The metallic content of the carrier catalyst includes metals selected from the group copper, manganese, chromium, iron, nickel, and the multivalent metals;
e) The catalytic carrier catalyst includes rare earth chlorides in a ratio of 0.05 to 0.10 with the multivalent metals listed in d);
f) The source of oxygen bearing gas is from the group enriched air and purified oxygen.

From the foregoing, it will be seen, and understood that: I claim:

1. A process for recovering chlorine from a feed stream containing hydrogen chloride comprises the steps of:
   a) providing an oxidation reactor,
   b) providing and delivering a carrier catalyst to form a bed in said oxidation reactor and operating said bed at temperatures between about 300 and 420° C.; said carrier catalyst comprising metallic chlorides, metallic hydroxy chloride and metallic oxide impregnated in a particulate, porous fluidizable solid material, wherein said solid material can adsorb and desorb hydrogen chloride, and is selected from the group consisting of zeolite, alumina, silica, carbon, and mixtures thereof,
   c) supplying said feed stream containing hydrogen chloride and an oxygen bearing gas to fluidize said oxidation reactor bed, and to exothermically react with each other in the presence of the metallic chlorides, metallic oxide and the metallic hydroxy chloride in the carrier catalyst to produce an overhead gas stream of chlorine, unreacted hydrogen chloride, inerts, water and residual oxygen;
   d) removing, cooling and compressing the overhead gas stream, wherein said overhead gas stream contains some entrained carrier catalyst;
   e) removing and cooling the carrier catalyst from the oxidation reactor bed;
   f) combining the cooled, compressed overhead gas stream of step d) and the cooled carrier catalyst of step e) at a position which is below the top level of the oxidation reactor bed to form a mixture;
   g) carrying said mixture into a high velocity transporter at temperature between 150° C. and 250° C., wherein the hydrogen chloride in the overhead gas stream part of the mixture reacts with the metallic oxide in the carrier catalyst part of the mixture to substantially eliminate the hydrogen chloride from said mixture;
   h) and removing the carrier catalyst from the resulting mixture of step g) thereby forming a gaseous product stream including chlorine, oxygen, inerts and water vapor, and recycling said removed carrier catalyst directly to said bed in said oxidation reactor.

2. The process of claim 1 wherein said step h) includes providing a separator for removing the carrier catalyst from the resulting mixture of step g).

3. The process of claim 2 wherein said separator is provided in the form of a cyclone separator, and the residence time of said mixture in said high velocity transporter is between 0.5 and 60 seconds.

4. The process of claim 2, wherein step g) includes passing the mixture through a heat transfer zone in said transporter to maintain the temperature between 150–250° C.

5. The process of claim 2 including combining said carrier catalyst with said overhead stream in step f) via an eductor.

6. The process of claim 3 wherein the mixture rises in the high velocity transporter at velocities between about 10 and 50 feet per second.

7. The process of claim 2 wherein metallic oxide rises in the oxidation reactor at rates between 0.5 and 5.0 feet per second, and wherein the residence of the mixture in the high velocity transporter is between 0.5 and 60 seconds.

8. The process of any of claims 1 thru 4 and 5 thru 7 in which the carrier catalyst contains oxide, chloride and hydroxy chloride of a metal selected from the group consisting of copper, manganese, chromium, iron, nickel and other multivalent metals.

9. The process of claim 8 in which the carrier catalyst contains a promoter comprising chloride of an alkali metal or an alkaline earth metal selected from the group consisting of sodium, potassium, lithium, calcium and magnesium, in atomic equality with said multivalent metals.

10. The process of claim 8 in which the carrier catalyst includes rare earth chlorides in a ratio of 0.05 to 0.10 with the multivalent metals in claim 10.

11. The process of claim 1 wherein the source of oxygen bearing gas is selected from the group consisting of air and oxygen.

12. The process of claim 1 wherein heat produced from exothermic reactions in the oxidation reactor provides the heat requires to balance the energy requirement to produce gaseous or liquid chlorine as a product.

\* \* \* \* \*